United States Patent [19]

Bernhardt

[11] Patent Number: 5,380,126

[45] Date of Patent: Jan. 10, 1995

[54] METHOD OF AND ARRANGEMENT FOR RINSING OUT IMPURITIES FROM GROUND

[75] Inventor: Bruno Bernhardt, Reutlingen, Germany

[73] Assignee: IEG Industrie-Engineering GmbH, Reutlingen, Germany

[21] Appl. No.: 63,988

[22] Filed: May 19, 1993

[30] Foreign Application Priority Data

Jun. 3, 1992 [DE] Germany ............... 4218255

[51] Int. Cl.⁶ .................. E03B 3/12; E03B 3/15
[52] U.S. Cl. ................... 405/128; 405/52; 166/306; 166/370; 210/170; 210/747
[58] Field of Search ............ 405/36, 43, 52, 128–131; 166/306, 370, 51, 278; 210/170, 747, 188, 202, 220, 901, 908

[56] References Cited

U.S. PATENT DOCUMENTS

| | | | |
|---|---|---|---|
| 3,111,983 | 11/1963 | Frank | 166/306 X |
| 4,766,957 | 8/1988 | McIntyre | 166/306 X |
| 4,805,697 | 2/1989 | Fouillout et al. | 166/306 X |
| 4,950,394 | 8/1990 | Bernhardt et al. | 210/170 |
| 5,080,172 | 1/1992 | Jones | 166/306 X |
| 5,116,163 | 5/1992 | Bernhardt . | |
| 5,154,538 | 10/1992 | Bockle | 405/128 |
| 5,171,103 | 12/1992 | Bernhardt | 405/128 |

FOREIGN PATENT DOCUMENTS

| | | | |
|---|---|---|---|
| 552442 | 1/1958 | Canada | 166/306 |
| 270826 | 8/1989 | German Dem. Rep. . | |
| 3842740 | 6/1990 | Germany . | |
| 3931011 | 3/1991 | Germany . | |
| 3931012 | 4/1991 | Germany . | |
| 3933426 | 6/1991 | Germany . | |

Primary Examiner—Randolph A. Reese
Assistant Examiner—John A. Ricci
Attorney, Agent, or Firm—Michael J. Striker

[57] ABSTRACT

A device for rinsing contaminants from ground comprises a perforated well tube sunk through a well shaft in the ground to ground water. The ground water is received in the well shaft through lower perforations, pumped up the well shaft, and out to upper ground regions through upper perforations, so that it can circulate back down to the ground water level, thus flushing contaminants from the upper ground regions. The circulation is accomplished with a well tube insert assembly placed in the well tube, comprising a seal device intermediate upper and lower well tube portions, a pipe through the seal, and a pump in the pipe to pump water from the lower portion to the upper portion. After circulation is established, the well tube insert assembly may be raised within the well tube to raise the level of circulation in the ground. A filter or cleaning device may be placed in the circulation path to remove contaminants.

13 Claims, 6 Drawing Sheets

METHOD OF AND ARRANGEMENT FOR RINSING OUT IMPURITIES FROM GROUND

BACKGROUND OF THE INVENTION

The present invention relates to a method of and an arrangement for rinsing out impurities in ground.

Methods and arrangements of the above mentioned general type are known in the art. It is known to sanitize in situ contaminated ground and contaminated ground water by forming a well shaft and using cleaning devices. The removal of impurities causes difficulties in regions with a strong ground water flow, since there is a danger that the impurities located above the ground water level in the well shaft will move deeper into the ground water and entrained in the ground water flow. In this case the sanitizing devices can contribute to environmental contamination. The impurities are not easily volatilized and they include for example mineral oils which can be eliminated from the ground only by washing or rinsing out. The above mentioned problems are especially difficult to solve in the regions with strong water flow.

SUMMARY OF THE INVENTION

Accordingly, it is an object of the present invention to provide a method of and an arrangement for washing out impurities in ground, which avoid the disadvantages of the prior art.

More particularly, it is an object of the present invention to provide a method and an arrangement of the above mentioned general type, with which the danger of displacing the impurities into the ground water is eliminated.

In keeping with these objects and with others which will become apparent hereinafter, one feature of the present invention resides, briefly stated, in a method in accordance with which a well shaft is formed at least close to above a ground water saturated zone and covered with a well tube with a wall which is water permeable at least in some regions, two liquid permeable well shaft regions separated from one another by a sealed well tube portion are formed and the sealed well shaft tube portion is bridged by a channel in which a liquid feed pump is arranged, the lower well tube region which has a liquid permeable wall is filled with a rinsing liquid, and the rinsing liquid is transported by the feed pump into the upper well tube region which has a liquid permeable wall for forming a rinsing liquid circulation through the well tube from below upwardly and back through the surrounding region and the permeable wall regions, whereby a cleaning device is arranged in the path of circulation at a corresponding location.

It is known to provide circulation in the well openings which extend to the ground water saturated ground region so that water circulates over the well shaft and is led through the cleaning devices. In deviation from this approach, in the present invention a rinsing water circulation is provided in the ground region which is not saturated with ground water, and the circulation is performed so that it must not lead to the ground region saturated with the flowing ground water. In the invention both a special rinsing water, and also the ground water taken from the saturated ground region and forming a rinsing water can be utilized. When the ground water is used as rinsing water, the impurities from the unsaturated ground region cannot arrive into the flowing ground water.

In the method in accordance with the present invention a so-called dynamic water peak is provided in the ground water-unsaturated ground region. The ground water or a special rinsing water flows out from the well shaft regions in the ground in the water peak and flows back to another well shaft region. For supporting this dynamic water peak and/or simultaneously driving out volatile impurities from the liquid in circulation, a negative pressure can be provided in the uppermost well shaft region. During circulation washing active substances can be additionally introduced above the ground water level into the rinsing liquid which is usually not permissible due to the danger of a ground water contamination. However, in the inventive method it is possible without any danger. It has been shown that also in the regions with strong ground water flow the capillary layer which covers the ground water saturated region from above and in which only a minimum ground water flow occurs, forms a safety barrier for preventing the circulating ground water with eventual washing active substances in condition of pressure difference formed during circulation, from flowing into the ground water flow. Thus the capillary layer can also be involved in the cleaning zone of the ground region.

The method in accordance with the present invention can be performed by means of devices which are already partially used for sanitation of ground water, but with special additional features. It is known to use for ground water sanitation a well shaft with at least partially water permeable wall and with a well shaft insert having a separating wall which sub-divides the interior of the well tube into several regions, and a tube which accommodates a feed pump extends through the separating wall. The uppermost region of the well shaft preferably has a special construction.

with a height adjustable well tube insert, the tube can advantageously form a supporting part of the well shaft insert. It can support at least a separating wall and in some cases a sealing part. It extends outwardly through an opening in the well shaft cover and supported on the latter so as to be axially displaceable and fixable.

For adjusting the device for performing the inventive method and make it suitable for different impurities, the uppermost well tube chamber can be provided with an upper portion having a greater diameter. A connecting ring wall provided at diameter-transition location is formed at least over its greater part as a liquid permeable sieve wall. Such sieve wall can preferably extend perpendicularly to the axis of the well tube. The increased uppermost well tube chamber facilitates the accommodation of cleaning parts, in particular exchangeable filters. Due to at least partially horizontal sieve wall through which a contaminated cleaning liquid, especially ground water can flow back to the cleaning ground region, the increased danger of clogging the sieve wall is substantially reduced. Moreover the filter materials above the sieve wall can be simply arranged in layers and be easily exchangeable. The used filter material is selected in correspondence with the impurities to be filtered out.

The portion of the uppermost well tube chamber which has a great diameter is advantageously subdivided by a concentric central wall into an outer and inner regions. The central wall in its part which is adjacent to the horizontal sieve wall is liquid impermeable and is formed liquid permeable in its part which is spaced from the connection-ring wall. As a result of this construction the rinsing liquid raised in the inner region can flow in an upper region into the outer region of the well tube chamber. Thereby, there a longer filter path is formed which partially can be composed of floating filter particles in liquid and are well suited for adaption of heavy oil phase. Such floating filter particles, in particular, small balls, can be exchanged and cleaned for example by centrifuging for removing the adherent impurities. In the inner region of the portion of the increased diameter of the uppermost well tube chamber, a filter can be arranged as well. Advantageously however it accommodates a device for treating raised liquid with gases, as is known for arrangements for cleaning the ground water.

The pipe which accommodates the feed pump and extends through the separating wall can be guided however through the uppermost well tube region outwardly to a cleaning device which is located outside of the well tube. A return conduit can lead from this device back into the uppermost well tube region and end there. The at least one pipe which extends through the separating wall can be provided with at least one perforated portion in the well shaft region, and this portion can be surrounded by an exchangeable filter.

The novel features of the present invention are set forth in particular in the appended claims. The invention itself, however, both as to its construction and its manner of operation will be best understood from the description of preferred embodiments which is accompanied by the following drawings.

DESCRIPTION OF PREFERRED EMBODIMENTS

Figure 1:
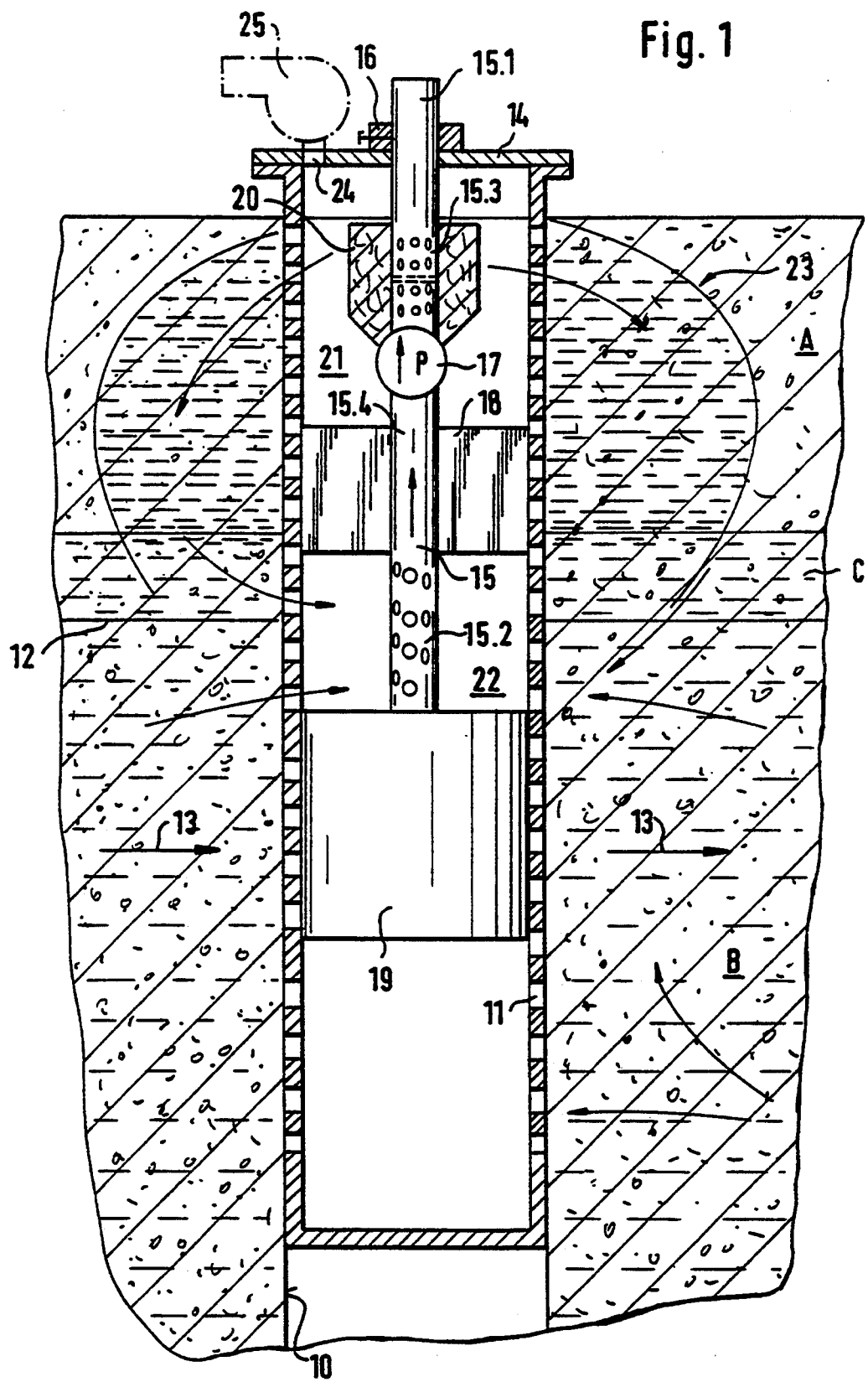
FIG. 1 is a schematic longitudinal section through a first embodiment with a well shaft and a well tube insert in a first operating position.
Figure 2:
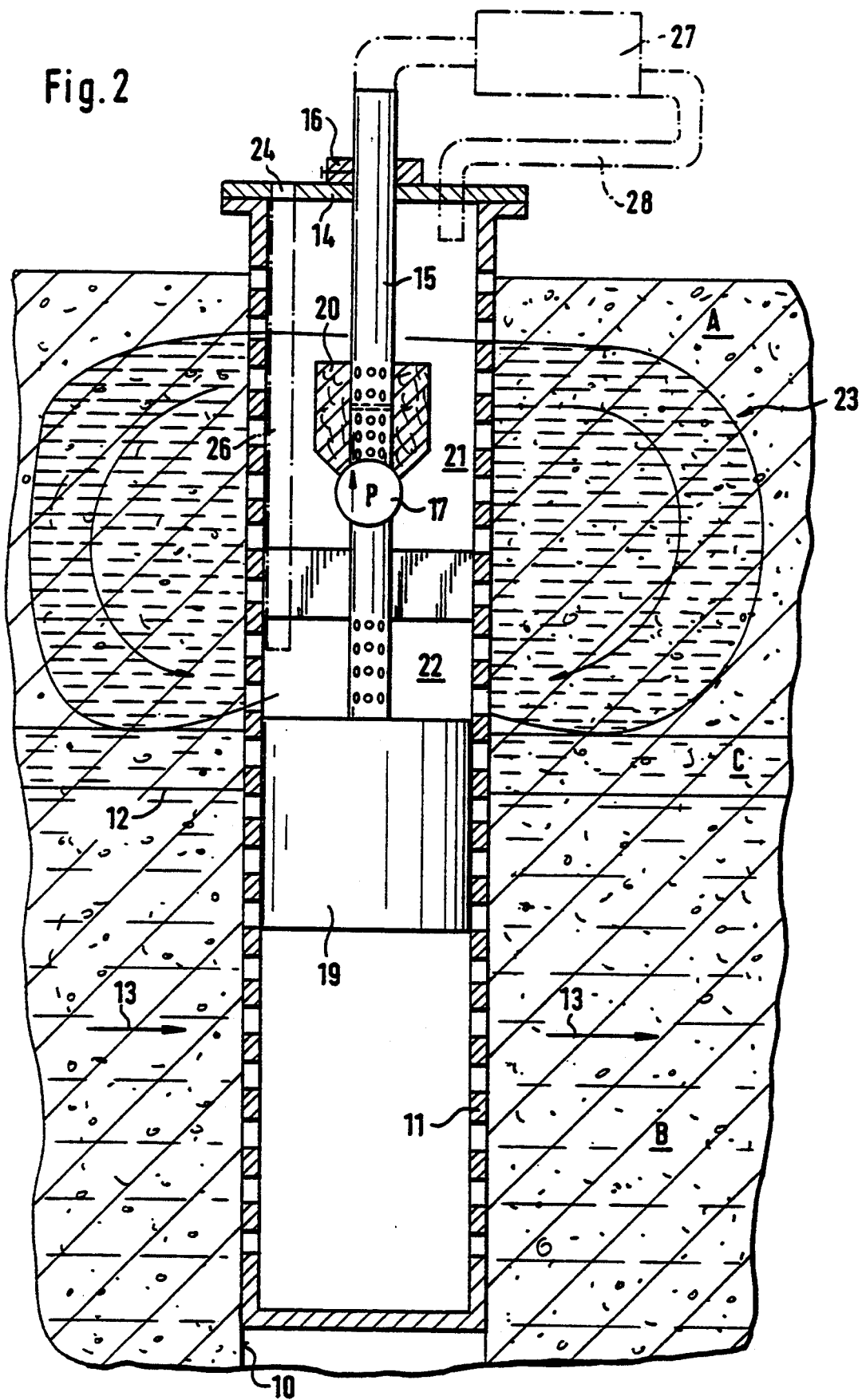
FIG. 2 is a section of the view of FIG. 1 with the well tube insert in a second operating position.

FIGS. 1 and 2 show a bored well shaft 10 with a perforated well tube 11 inserted in it. The well shaft 10 extends through a contaminated upper ground region A which is not saturated with ground water, to a ground region B located under the ground region A and saturated with ground water. The ground water flow in the region B is identified with the arrow 13. The ground water level is identified with reference numeral 12. A capillary region C is located above the ground water level 12. It can be ground water-saturated, and no ground water flow takes place in it. The well tube 11 is closed from outside by a cover 14.

A well tube insert is arranged inside the perforated well tube 11 and is displaceable in the longitudinal direction of the well tube. The well tube insert includes a central pipe 15 having an upper end region 15.1 which extends outwardly through a central opening of the well tube cover 14 and releasably connected with the latter by a clamping ring 16. The pipe 15 has a lower perforated portion 15.2, an upper perforated portion 15.3 and an intermediate not perforated portion 15.4. A liquid feed pump 17 is located in the intermediate not perforated portion 15.4. A separating wall part 18 which extends closely relative to the wall of the well tube 11 is mounted on the central not perforated portion 15.4. A relatively long sealing part 19 which also extends closely to the wall of the well tube 11 is mounted on the lower end of the pipe 15. The upper perforated portion 15.3 of the pipe 15 is surrounded by an exchangeable filter pack 20.

The separating wall part 18 sub-divides the inner chamber of the well tube 11 into an upper well tube region 21 and a lower well tube region 22, and the lower well tube region 22 is limited downwardly by the sealing part 19. Both well tube regions 21 and 22 have a liquid permeable wall, while the region located between them and the downwardly closing region of the well tube wall are sealed by the separating wall part 18 and the sealing part 19, in a liquid impermeable manner.

In FIG. 1 the well tube insert is located in its lowered position, in which the well tube region 22 extends under the ground water level 12, and the ground water can flow into this water tube region 22. This water is supplied by the feed pump 17 through the central pipe 15 upwardly and flows through the filter pack 20 in the well tube region 21, from which it can flow only outwardly through the perforated wall of the wall tube 11 into the upper ground region A which is not saturated with ground water. Here the upwardly pumped ground water forms a dynamic water peak. When the water peak is formed with a sufficient size, the well tube insert is pulled up on its central pipe 15, and the whole well tube region 22 is moved above the ground water level 12. In the shown embodiment the well tube region 22 ends over the capillary zone C of the ground. Now the ground water can flow back from the dynamic water peak 23 into the lower well tube region 22 and is transported further upwardly by the feed pump 17. It maintains with the liquid from the water peak 23 a rinsing circulation in the ground region A, which displaces the impurities located in the ground region A with the flow and collects them in the exchangeable filter pack 20.

Through an opening 24 in the cover 14 water or another rinsing liquid can be additionally supplied for compensating liquid losses in the liquid circulation. Also washing active substances can be introduced into the liquid circulation in the operating position of the well tube insert in FIG. 2. A fan 25 identified in dash-dot lines can be arranged on the opening 24 or another opening of the cover 14 for producing a negative pressure in the liquid free upper well tube region.

In the shown first embodiment the circulation in the ground region A is operated by the ground water withdrawn from the ground region B. The circulation can be performed however by another rinsing liquid. In the operating position of FIG. 2 the rinsing water is supplied through a conduit 26 shown in dash-dot lines into the well tube region 17 upwardly, and the other (foreign) liquid flows out in the surrounding region so as to form the dynamic water peak with the other liquid. Inside this water peak the rinsing process takes place and the dissolved impurities are transported by the liquid circulation into the filter pack 20. The sealing part 19 prevents inside the well tube 11 an escape of the liquid from circulation into the ground region B saturated with the flowing water. Outside the well tube the escape of rinsing liquid is prevented by the feed pump 17 which maintains the circulation and also by the discharge-blocking layer in the capillary region C, in combination.

Instead of the filter pack 20, a cleaning device can be arranged outside the well tube as shown in FIG. 2 in dash-dot lines. The rinsing liquid is supplied by the feed pump 17 through the cleaning device, and the rinsing liquid flows from the cleaning device through a return conduit 28 into the upper well tube region 21. The feed pump 17 can be also arranged in a portion of the pipe 15 located outside the well tube 11.

Figure 3:
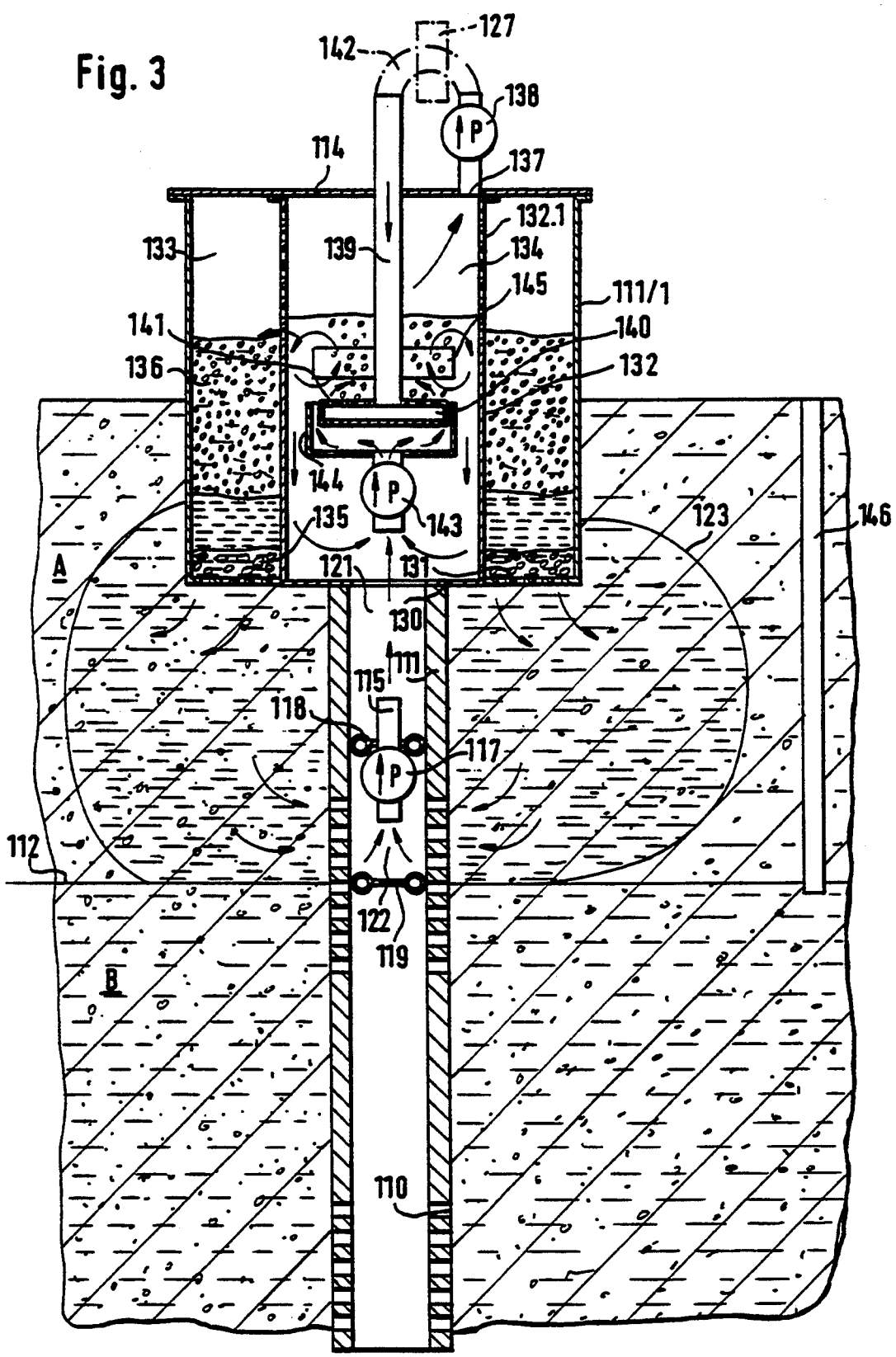
FIG. 3 is a second embodiment of a device for performing an inventive method with an uppermost well tube chamber having a portion of a greater diameter with a device for treating raised liquid with gases, in a first possible operating position of the well tube insert.
Figure 4:
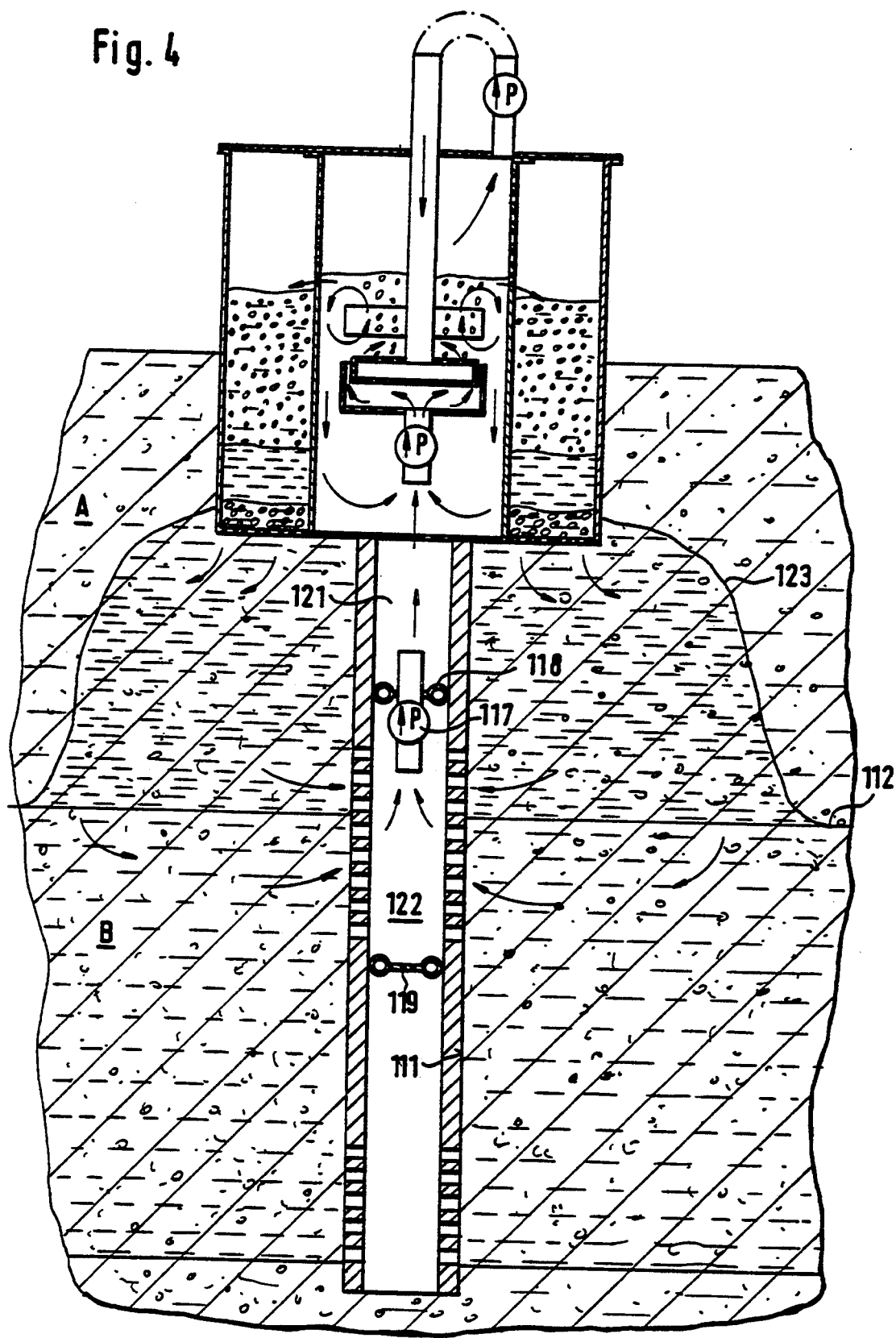
FIG. 4 is a section of the view of FIG. 1 through the second embodiment in a second possible operating position of its well tube insert.
Figure 5:
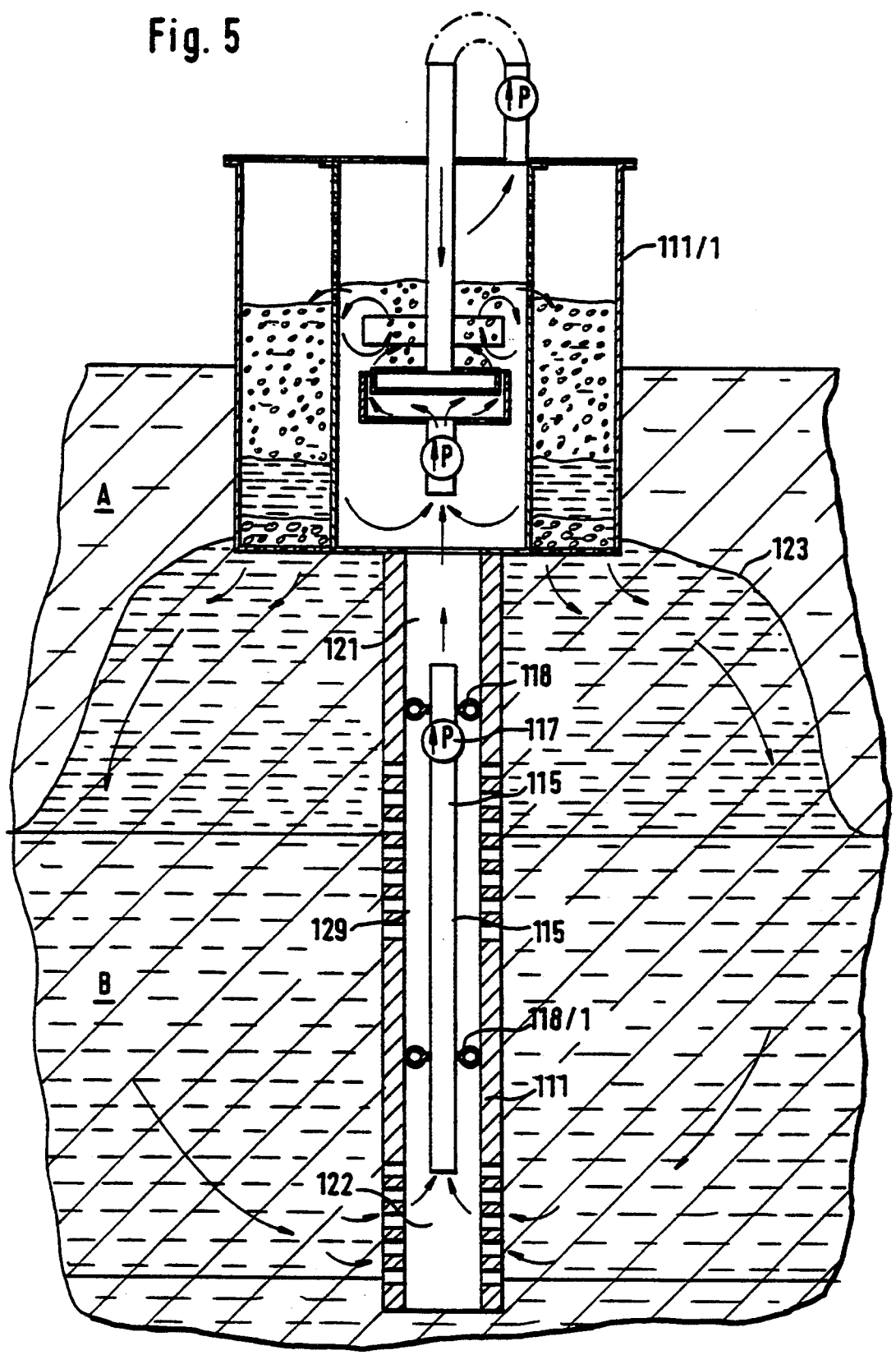
FIG. 5 is a section of FIG. 3 of the second embodiment with a different construction of the well tube insert in a third possible operating position.

In the embodiment of an arrangement shown in FIGS. 3–5 the parts which correspond to the part of the first embodiment are identified with reference numerals increased by 100. This arrangement differs from the arrangement of FIGS. 1 and 2 in that the well tube 111 in its upper end region 111/1 is increased in stepped fashion to a substantially greater diameter and in this expanded region an impermeable outer wall is provided. The connection ring wall 130 formed at the transition to the upper region 111/1 is formed mainly as a horizontal sieve wall 131 in the built-in position, so that liquid can flow through it from the diameter-increased well tube chamber into the ground region A.

The end portion 111/1 of the well tube 111 is subdivided by a concentric central wall 132 into an outer region 133 and an inner region 134. The central wall 132 in its part 132.1 which is spaced from the sieve wall 131 is water permeable. Therefore in this upper region a liquid overflow from the inner region 134 to the outer region 133 takes place. The inner region 134 communicates with a connected well tube region 121 which is separated by a separating wall 118 from a downwardly following well tube region 122. The separating wall 118 is arranged as in the embodiment of FIGS. 1 and 2 so that a pipe 115 extends through it and accommodates a feed pump 117.

A known device for generating a negative pressure and removing volatile components from the upwardly supplied liquid is arranged in the inner region 134. It serves simultaneously for supporting the formed dynamic water peek 123. A fan 138 is arranged over the opening 137 in the cover 114 and produces a negative pressure in the inner region 134. Thereby outside air or another gas is, aspirated into a chamber 140, is supplied through a perforated upper wall 141 of this chamber in form of gas bubbles into the liquid located above the chamber 140 and entrains the volatile substances during passage through the liquid. With the use of a special gas, the fan 138 can operate a closed gas circulation. The outlet of the fan 138 is connected with the inlet of the tube 139 as identified by a tube bridge 142 shown in dash-dot lines. A cleaning device 127 is located in the gas circulation path for catching the entrained volatile impurities, which can be coupled with a dosing device for admixing gas or feeding gas.

The liquid which is located in the inner region 134 of the uppermost well tube chamber is brought into intense movement by an additional circulating pump 143. The pump 143 transports the liquid which is pumped from below by the pump 117, into a shell 144 which surrounds the gas chamber 140 and is open upwardly. A guiding ring 145 located above the air chamber 140 contributes to the circulating movement of liquid which flows partially along the central wall 132 downwardly to the inlet of the feed pump 143 and partially through the liquid permeable region 132.1 of the central wall 132 into the outer region 133 of the uppermost well tube chamber 111/1, flows through both filter regions 136 and 135 and through the sieve wall 131 outwardly back into the produced dynamic water peak 123. This circulation and a horizontal expansion of the water peak is assisted especially in dense ground by adjacent pressure unloading openings 146.

During the operation in accordance with FIG. 3 the separating wall 119 which downwardly seals the well tube is adjusted to the height of the ground water level 112, so that all rinsing liquid from the produced dynamic water peak 123 above the water ground level 112 flows back through openings in the wall of the well tube 111 into the well tube region 122 and from them is supplied upwardly by the feed pump 117.

In the operating position of FIG. 4 the separating wall 119 which seals the well tube 111 downwardly is located under the ground water level 112. Therefore ground water flows into the well tube region 122 and forms by means of the feed pump 117 in the liquid circulation the dynamic ground water peak 123 in the ground region A. The separating walls 118 and 119, in the second embodiment of the arrangement can be also adjusted from above by a not shown connecting member.

In the operating position of FIG. 5 a part of the ground water region is involved into the cleaning circulation of liquid. The well tube region 122 is located at the closed side end of the well tube 111 and closed from above by a separating wall 118/1. The pipe 115 accommodating the feed pump 117 passes both through the upper separating wall 118 and the lower separating wall 118/1 and bridges the intermediate region 129.

Figure 6:
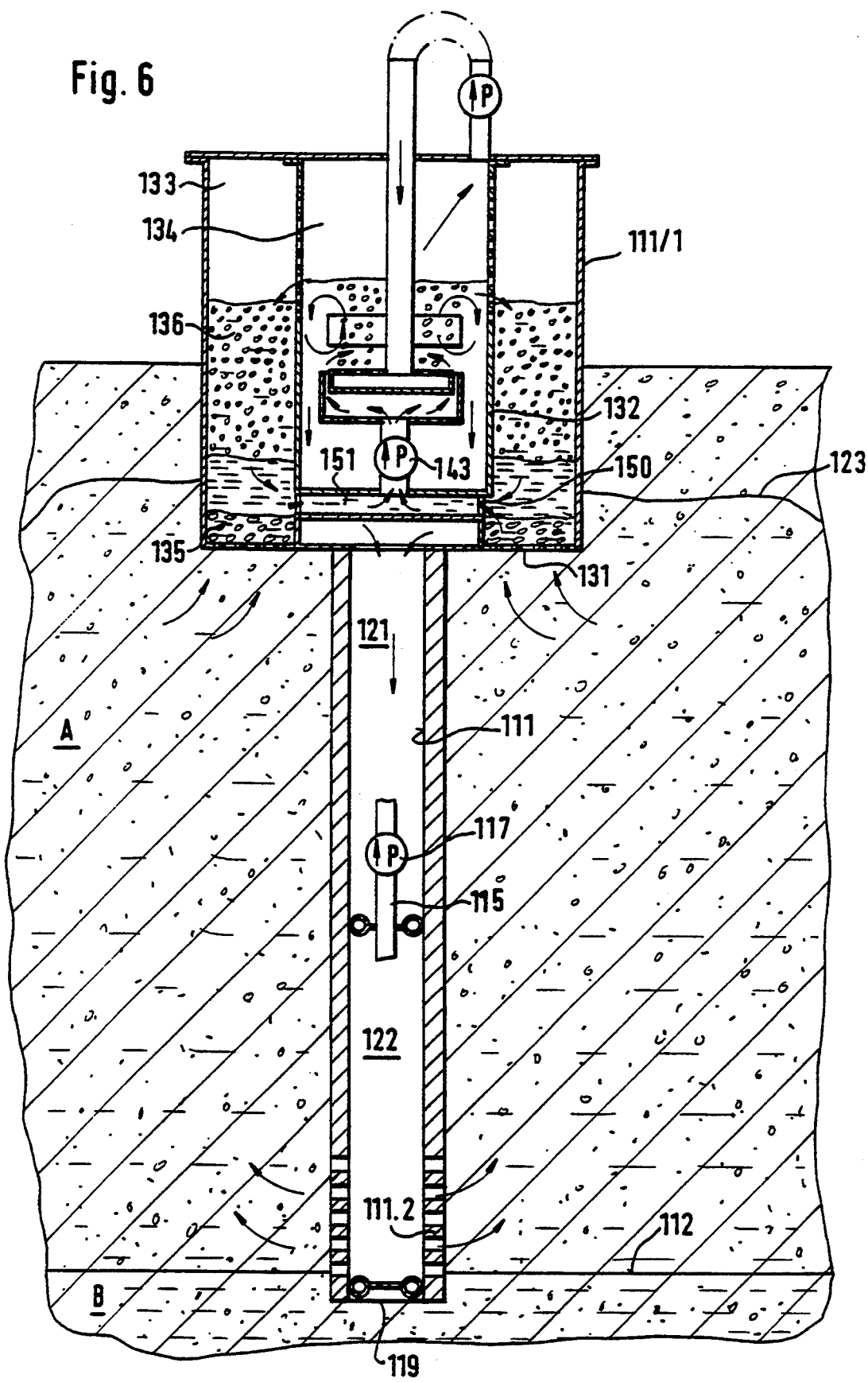
FIG. 6 is a section of FIG. 3 through a third embodiment of an arrangement for performing the method.

The arrangement in accordance with the third embodiment of FIG. 6 can be formed so that the liquid circulation is performed in a reverse direction. In the produced dynamic water peak 123 the rinsing liquid in the ground region A flows from below upwardly and is supplied in the well tube 111 by the feed pump 117 from the well tube region 121 downwardly in the well tube region 122. There it is discharged through a liquid permeable region 111.2 of the well tube 111 above the ground water level 112 outwardly. The upper entry in the well tube portion 111/1 is performed through the sieve wall 131. The well tube insert is changed in that the central wall 132 in its lower region has at least two openings 150, from which pipes 151 lead from the inner region 134 of the diameter-increased well tube portion 111/1 to the suction side of the feed pump 143 of the cleaning device.

Under the suction action of the feed pump 143 the rinsing liquid is aspirated through the sieve wall 131 and the filter layer 135 in the pipe 151 and supplied by the feed pump 143 to the cleaning device which was described in connection with the embodiment of FIG. 3. The rinsing liquid which flows back in the inner region 134 to the central wall 132 downwardly, is supplied through the pipes 151 in the well tube region 121 and in the operating region of the feed pump 117. The rinsing liquid which flows over from the inner region 134 to the outer region 133 is supplied through the filter layer 136 downwardly and again in the aspirating region of the upper feed pump 143. Thereby an inner and an outer circulation are produced and intersect one another.

The present invention is not limited to the details shown since various modifications and structural changes are possible without departing in any way from the spirit of the present invention.

What is desired to be protected by Letters Patent is set forth in particular in the appended claims.

I claim:

1. A method of rinsing out impurities from ground located above a ground water level, comprising the steps of:
    forming a well shaft in the ground which extends down below a ground water saturated zone;
    placing in the well shaft a well tube, said well tube having water permeable portions at a lower and an upper region thereof;
    placing a sealing means in said well shaft to separate the upper and lower well tube regions, and placing a channel, accommodating a liquid feed pump, through said sealing means to provide communication between the upper and lower regions, the sealing means and associated channel and pump being vertically adjustable through the well tube;
    allowing ground water to enter the lower well tube region through the lower permeable portion, and pumping the water upward through the channel to the upper well tube region, where it exits to the ground through the upper permeable portion and circulates through the ground toward the ground water saturated zone, thus tending to raise the ground water above its natural level;
    raising the sealing means and associated channel and pump to raise the level of liquid circulation;
    arranging a cleaning device in a path of the circulation to remove said impurities from the water.

2. A method as defined in claim 1 and further comprising supplying liquid from outside into the circulation path to compensate for circulation losses.

3. A method as defined in claim 1 and further comprising providing negative pressure in the upper well tube region.

4. A method as defined in claim 1 and further comprising introducing washing agents into the circulation path.

5. Apparatus for rinsing out impurities from ground located above a ground water level, comprising:
    a well tube located in a well shaft, said well tube having water permeable portions at a lower and an upper region thereof;
    a well tube insert assembly located within said well tube, said well tube insert assembly comprising:
        a wall means to separate said well tube into upper and lower well tube regions;
        a pipe means, accommodating a liquid pump, through said wall means to provide communication between the upper and lower well tube regions;
        a sealing means mounted to the pipe means below said wall means to prevent liquid flow downward beyond the sealing means, said wall means and sealing means being rigidly mounted to and supported by said pipe means;
    a well tube cover at an upper end of said well tube, with an opening, said pipe means extending through said opening and being axially displaceable and fixedly supportable through said opening to adjust the vertical location of the well tube insert assembly within said well tube.

6. Apparatus as in claim 5, wherein said pipe extends cut through the top of said well tube, and is connected to an external liquid cleaning device to clean liquid removed from said well tube; and a return conduit to return liquid from said cleaning device to said upper well tube region.

7. Apparatus for rinsing out impurities from ground located above a ground water level, comprising:
    a well tube located in a well shaft, said well tube having water permeable portions at a lower and an upper region thereof, said well tube having an uppermost portion with a greater diameter than a remaining portion, and a connecting ring wall between said uppermost portion and remaining portion, said connecting ring wall being liquid permeable over a majority of its surface;
    a well tube insert assembly located within said well tube, said well tube insert assembly comprising:
        a wall means to separate said well tube into upper and lower well tube regions;
        a pipe means, accommodating a liquid pump, through said wall means to provide communication between the upper and lower well tube regions;
        a sealing means mounted to the pipe means below said wall means to prevent liquid flow downward beyond the sealing means.

8. Apparatus as defined in claim 7, wherein said connecting ring wall extends in a plane substantially perpendicular to an axis of said well tube.

9. Apparatus as defined in claim 7, and further comprising filter material in said uppermost well tube portion above said connecting ring wall.

10. Apparatus as defined in claim 7, wherein said uppermost well tube portion comprises an outer tubular wall, and comprising a further tubular wall within said uppermost portion and concentric with said outer wall, and dividing said uppermost portion into outer and inner regions, said further tubular wall having a lower portion, near said connecting ring wall, which is water impermeable, and a portion remote from said connecting ring wall which is water permeable.

11. Apparatus as defined in claim 10, further comprising filter means comprising filter particles floating in liquid, in said outer region of said uppermost well tube portion.

12. Apparatus as defined in claim 10, further comprising a device for treating liquid with gases, arranged in said inner region of said uppermost well tube portion.

13. Apparatus for rinsing out impurities from ground located above a ground water level, comprising:
    a well tube located in a well shaft, said well tube having water permeable portions at a lower and an upper region thereof;
    a well tube insert assembly located within said well tube, said well tube insert assembly comprising:
        a wall means to separate said well tube into upper and lower well tube regions;
        a pipe means, accommodating a liquid pump, through said wall means to provide communication between the upper and lower well tube regions, said pipe means having at least one perforated portion located in at least one of said upper and lower well tube regions, and at least one filter means which surrounds said at least one perforated portion;
        a sealing means mounted to the pipe means below said wall means to prevent liquid flow downward beyond the sealing means.

* * * * *